United States Patent
Toyoshima et al.

(10) Patent No.: US 10,359,326 B2
(45) Date of Patent: *Jul. 23, 2019

(54) PRESSURE SENSOR CAPABLE OF SUPPRESSING DISPERSION IN THE INITIAL LOAD OF PRESSURE

(71) Applicant: NIPPON MEKTRON, LTD., Tokyo (JP)

(72) Inventors: Ryoichi Toyoshima, Tokyo (JP); Keizo Toyama, Tokyo (JP); Hirokazu Ohdate, Tokyo (JP); Masayuki Iwase, Tokyo (JP)

(73) Assignee: NIPPON MEKTRON, LTD., Tokyo (JP)

( * ) Notice: Subject to any disclaimer, the term of this patent is extended or adjusted under 35 U.S.C. 154(b) by 367 days.

This patent is subject to a terminal disclaimer.

(21) Appl. No.: 15/222,166

(22) Filed: Jul. 28, 2016

(65) Prior Publication Data
US 2017/0089778 A1 Mar. 30, 2017

(30) Foreign Application Priority Data

Sep. 24, 2015 (JP) ................................. 2015-187147

(51) Int. Cl.
*G01L 1/00* (2006.01)
*G01L 5/00* (2006.01)
*G01L 1/20* (2006.01)

(52) U.S. Cl.
CPC ............ *G01L 5/0038* (2013.01); *G01L 1/205* (2013.01)

(58) Field of Classification Search
CPC ..... G01L 5/0038; G01L 1/205; G01L 1/2287; G01L 9/0054; G01L 9/04; G01L 9/00; H01C 10/10
See application file for complete search history.

(56) References Cited

U.S. PATENT DOCUMENTS

| 5,878,620 A | 3/1999 | Gilbert et al. |
| 6,388,556 B1 * | 5/2002 | Imai .......................... G01L 1/20 338/114 |

(Continued)

FOREIGN PATENT DOCUMENTS

| JP | 3017968 B2 | 3/2000 |
| JP | 2001-099726 A | 4/2001 |

(Continued)

OTHER PUBLICATIONS

Decision to Grant a Patent dated Jul. 14, 2015, issued in JP application No. 2015-515750(counterpart to U.S. Appl. No. 14/769,290:, with English translation. (4 pages).

(Continued)

*Primary Examiner* — Harshad R Patel
*Assistant Examiner* — Nigel H Plumb
(74) *Attorney, Agent, or Firm* — Westerman, Hattori, Daniels & Adrian, LLP

(57) ABSTRACT

This invention provides a pressure sensitive element capable of suppressing dispersion in the initial load for pressure sensing among the sensor electrodes or among the pressure sensors. The pressure sensitive element has a support substrate, a sensor electrode, a pressure sensing film and an insulating layer. The pressure sensing film is arranged opposing to the sensor electrode. The insulating layer has an opening and is provided between the support substrate and the pressure sensing film. At least a part of an opening edge of the opening is fallen on the sensor electrode. An exposed part as a part of the sensor electrode is exposed inside the opening, while leaving a buried part as the other part of the sensor electrode buried under the insulating layer.

17 Claims, 7 Drawing Sheets

(56) References Cited

U.S. PATENT DOCUMENTS

| | | | |
|---|---|---|---|
| 6,531,951 B2 | 3/2003 | Serban et al. | |
| 6,626,046 B2 | 9/2003 | Taguchi et al. | |
| 6,829,942 B2 * | 12/2004 | Yanai | A61B 5/113 |
| | | | 73/716 |
| 7,373,843 B2 | 5/2008 | Ganapathi et al. | |
| 7,398,587 B2 * | 7/2008 | Morimoto | G01L 1/142 |
| | | | 29/592.1 |
| 7,644,623 B2 * | 1/2010 | Yokura | G01K 5/52 |
| | | | 73/726 |
| 7,775,119 B1 * | 8/2010 | Suminto | G01L 9/0042 |
| | | | 73/727 |
| 9,574,955 B2 * | 2/2017 | Iwase | A61B 5/447 |
| 2002/0050173 A1 | 5/2002 | Taguchi et al. | |
| 2004/0000195 A1 | 1/2004 | Yanai et al. | |
| 2006/0016267 A1 * | 1/2006 | Tanaka | G01L 9/0054 |
| | | | 73/754 |
| 2006/0272429 A1 | 12/2006 | Ganapathi et al. | |
| 2012/0204657 A1 * | 8/2012 | Suzuki | G06F 3/041 |
| | | | 73/862.68 |
| 2014/0150571 A1 | 6/2014 | Kuniyoshi et al. | |
| 2016/0153857 A1 * | 6/2016 | Matsuzawa | G01L 9/0054 |
| | | | 73/727 |

FOREIGN PATENT DOCUMENTS

| | | |
|---|---|---|
| JP | 2001-159569 A | 6/2001 |
| JP | 2002-131155 A | 5/2002 |
| JP | 2002-158103 A | 5/2002 |
| JP | 2002-525564 A | 8/2002 |
| JP | 2004-28883 A | 1/2004 |
| JP | 2010-175312 A | 8/2010 |
| JP | 2012-121363 A | 6/2012 |
| WO | 2012/165082 A1 | 12/2012 |

OTHER PUBLICATIONS

International Search Report dated Feb. 10, 2015, issued in counterpart application No. PCT/JP2015/050817. (1 pages).
Written Opinion dated Feb. 10, 2015, issued in counterpart application No. PCT/JP2015/050817, with English translation. (6 pages).
Office Action dated Feb. 26, 2019, issued in counterpart JP application No. 2015-187147, with English translation. (10 pages).

* cited by examiner

PRESSURE SENSOR CAPABLE OF SUPPRESSING DISPERSION IN THE INITIAL LOAD OF PRESSURE

This application is based on Japanese patent application No. 2015-187147, filed on Sep. 24, 2015, the content of which is incorporated hereinto by reference.

BACKGROUND OF THE INVENTION

Field of the Invention

This invention relates to a pressure sensitive element, and a pressure sensor having the pressure sensitive element.

Description of the Related Art

Lightweight and flexible pressure sensors have widely been used in recent years. For example in the automotive industry, the pressure sensor is embedded into a seat, so as to enable control for prompting a passenger to fasten a seat belt, when applied with a certain level or larger load (body weight) by the passenger who gets into a vehicle and takes the seat.

As another exemplary application, the flexible pressure sensor is also expected to be applied to the medical or nursing care field. For example, the pressure sensor is proposed to be embedded into a mattress of bed, for the purpose of detecting how the weight of a patient or aged person (also referred to as "patients, etc.", hereinafter) lying on the bed is applied to the mattress. It now becomes possible to detect that the patients, etc. might have been remained in a fixed posture for a long duration of time, and to ask someone to avoid bedsores. Alternatively, if the pressure sensor is mounted on shoes worn by an aged person, it also becomes possible to detect any change in pressure distribution caused by unbalanced load of body weight when the person was about to fall during walking, and to give some support operation to recover a correct posture.

In still another application, by combining the pressure sensor with a touch panel to be incorporated into mobile equipment or the like, it becomes possible to detect a two-dimensional coordinate point on a display screen using a touch panel, and to detect the load of touch using the pressure sensor. In this way, an interface improved in convenience than ever would become available.

The pressure sensor is roughly composed of a pressure sensitive element whose electrical characteristic such as resistivity varies depending on pressurizing force, and a detection unit which detects such change in the electrical characteristic in the pressure sensitive element. There has been proposed a conventional flexible pressure sensitive element, in which a sheet-like support substrate having a sensor electrode patterned thereon, and an opposing substrate arranged opposing to the sensor electrode and having a pressure sensing resistor, are stacked while placing an insulating spacer in between. For example, Patent Documents 1 to 3 below describe so-called "short-circuit bar type" pressure sensors, which detect pressurizing operation based on changes in the electrical characteristic, caused by short-circuiting between the sensor electrode and the pressure-sensing resistor when the pressure sensitive element is pressed.

More specifically, JP-A-2002-158103 (Patent Document 1) describes a pressure sensor in which one circuit substrate having a sensor electrode provided thereon, and the other circuit substrate having a pressure sensing resistor formed thereon by printing, are opposed to each other while placing a spacer sheet in between. The circuit substrates are films, and the spacer sheet is a PET (polyethylene terephthalate) film having adhesive layers formed on both faces thereof. On both faces of the spacer sheet, the one and the other circuit substrates are bonded respectively.

The pressure sensor described in JP-A-2004-028883 (Patent Document 2) has one base film having thereon electrodes, the other base film having thereon a pressure sensing resistor, and a spacer placed in between. By the thickness of the spacer, the opposing electrodes and the pressure sensing resistor are kept apart when unpressurized. The spacer is made of a resin film, and has thermosetting resin adhesive layers formed on both surfaces thereof. By aid of the adhesiveness of the thermosetting resin adhesive, the one and the other base films, and the spacer are integrated.

A pressure sensor described in JP-A-2001-159569 (Patent Document 3) is configured by bonding a resistor substrate and an electrode support substrate, while placing an acrylic adhesive film or an adhesive layer of a PET-based adhesive in between. For the resistor substrate and the electrode support substrate, PET films are used. JP-A-2001-159569 (Patent Document 3) describes that the adhesive film or the adhesive are cured by heating to form a spacer. The adhesive layer has the thickness larger than the total thickness of the pressure sensing resistor and the sensor electrode, so as to keep the pressure sensing resistor and the sensor electrodes opposed, and away from each other.

In a typical short-circuit bar type pressure sensor, the sensor electrode and the pressure sensing resistor are kept apart, when the pressure sensitive element is not loaded. The sensor electrode and the pressure sensing resistor are arranged apart, while placing an insulating spacer in between. Each of the spacers in Patent Documents 1 to 3 is obtained by punching a film to form an opening, and by laminating or bonding the film to the base film while aligning the opening to the sensor electrodes. JP-A-2001-159569 (Patent Document 3) also describes that, as another embodiment, the spacer may be formed by coating a PET-based adhesive around the sensor electrode. The pressure sensor in this embodiment is configured so as to allow the sensor electrode and the pressure sensing film to come into contact, upon the load applied to the pressure sensitive element exceeds a specific threshold value, and so as to allow electric current (sensor current) to flow therethrough. This threshold value may occasionally be referred to as "initial load for pressure sensing". The pressure sensor measures the resistivity which appears when the sensor current flows through the sensor electrode, and converts the resistivity into a load value or pressure value, and then outputs it.

Patent Document

[Patent Document 1] JP-A-2002-158103
[Patent Document 2] JP-A-2004-028883
[Patent Document 3] JP-A-2001-159569

SUMMARY OF THE INVENTION

Considering now diversified applications of the pressure sensor described above, there may be a need for a super-fine pressure sensitive element having a sensor electrode patterned within a several-millimeter-square area, or a high-resolution pressure sensitive element having an initial load for pressure sensing of 100 g weight (approx. 1 N) or smaller. On the contrary, there may be a need for a one-meter-square or larger pressure sensor having a plurality of pressure sensitive elements arrayed therein, suited to a large-scale and heavy-load sensing. In view of mass-production of the pressure sensor having a variety of pressure-sensing characteristics depending on applications, it is necessary to suppress dispersion in the initial load for pressure sensing among products, so that it is necessary to stabilize qualities such as accuracy of alignment between the sensor electrodes and the spacer, and the accuracy of thickness of spacer.

However, the pressure sensors described in Patent Documents 1 to 3, which are manufactured by preliminarily punching a spacer film to form the opening, providing tacky layers or the adhesive layers on both surfaces of the film, and then by laminating or bonding it to the base film such as PET film, so that the sensor electrode and the opening are very difficult to be aligned.

For example, considering a practical process of manufacture, the support substrate having the sensor electrodes formed thereon and the spacer film may be aligned and laminated using a pin guide or the like, with a positional accuracy of ±100 μm at most. For this reason, a relative misalignment of at least ±100 μm, which varies from product to product, may occur between the opening of the spacer and the sensor electrodes, causing a large dispersion in output characteristic of the pressure sensor. The smaller and the finer the sensor electrodes of the pressure sensitive element would be, the more notable an effect of dispersion in the output characteristic of the pressure sensor due to misalignment of lamination would be.

On the other hand, when the PET-based adhesive is coated so as to surround the sensor electrodes and then cured under heating to form the spacer, as described in JP-A-2001-159569 (Patent Document 3), it is necessary to coat, on the support substrate, the adhesive with a thickness larger than the total thickness of the pressure sensing resistor and the sensor electrode, making it difficult to precisely control the thickness of coating. If the thickness of coating of the adhesive should vary from opening to opening, or from product to product, the initial load for pressure sensing may unfortunately vary among the sensor electrodes or among pressure sensors.

This invention, conceived in consideration of the above-described problems, is to provide a pressure sensitive element capable of suppressing dispersion in the initial load for pressure sensing among the sensor electrodes or among the pressure sensors, and a pressure sensor equipped with such pressure sensitive element.

The pressure sensitive element of this invention has a support substrate; an electroconductive conductor pattern supported by the support substrate; a pressure sensing film arranged opposing to the conductor pattern; and an insulating layer having an opening, and being provided between the support substrate and the pressure sensing film, at least a part of the opening edge of the opening falling on the conductor pattern, and a part of the conductor pattern being exposed inside the opening, leaving the residual part buried under the insulating layer.

A pressure sensor of this invention has the pressure sensitive element described above, and a detection unit electrically connected to the pressure sensitive element, the conductor pattern containing a sensor electrode having connected thereto a lead-out line, and the detection unit being configured to detect electrical characteristic of the pressure sensitive element, which varies depending on contact resistance between the pressure sensing film and the sensor electrode.

BRIEF DESCRIPTION OF THE DRAWINGS

The above and other objects, advantages and features of the present invention will be more apparent from the following description of certain preferred embodiments taken in conjunction with the accompanying drawings, in which:

FIG. 3A illustrates a step of coating a photosensitive coating material by screen printing, over a support substrate having a sensor electrode formed thereon. FIG. 3B illustrates a state of coating the photosensitive coating material over the support substrate, followed by light exposure. FIG. 3C illustrates a state of forming an insulating layer with an opening, by way of light exposure and development.

DETAILED DESCRIPTION OF THE PREFERRED EMBODIMENTS

Figure 1:
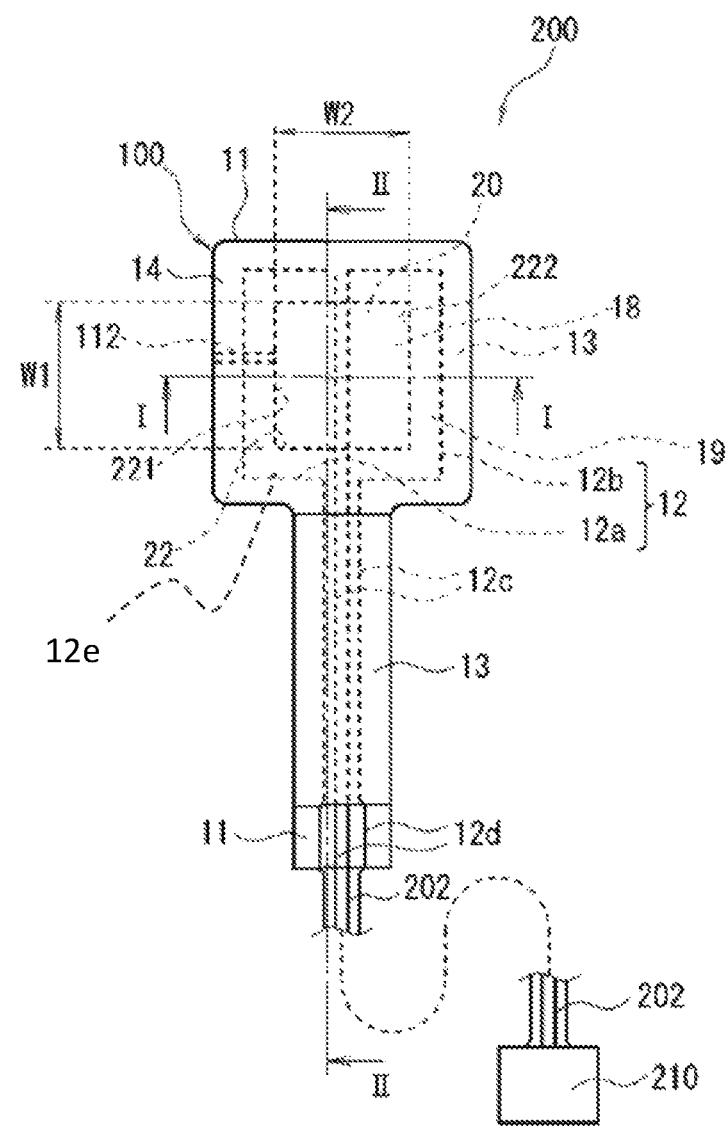
FIG. 1 is a plan view illustrating a pressure sensor according to a first embodiment of this invention.

This invention will be now described herein with reference to illustrative embodiments. Those skilled in the art will recognize that many alternative embodiments can be accomplished using the teaching of this invention and that this invention is not limited to the embodiments illustrated for explanatory purposes.

Embodiments of this invention will be explained below, referring to the attached drawings. Note that, in all drawings, all similar constituents will be given the same reference numerals or symbols, in order to avoid repetitive explanation for convenience.

Various constituents of this invention are not always necessarily be independent entities, instead allowing typically that a plurality of constituents are combined to form a single member, that a single constituent is composed of a plurality of members, that one constituent forms a part of other constituent, and that a part of one constituent overlaps a part of other constituent.

In this embodiment, "sheet" and "film" are not discriminated but are synonymous, and also include so-called board-like article and plate-like article.

In this specification, "the initial state" means a state without being applied with any external pressurizing force. "Initial detection sensitivity" means a sensitivity at which the initial load for pressure sensing is detected. The "initial load for pressure sensing" means the minimum pressurizing force at which electric conduction through the sensor electrode is detectable, when the pressure sensing film is externally pressurized to come into contact with the sensor electrode. "Electric conduction is detectable" means either that current or voltage at or above a predetermined threshold value is detected, or that current or voltage exceeding zero is substantially detectable. The smaller the initial load for pressure sensing, the higher the initial detection sensitivity, meanwhile the larger the initial load for pressure sensing, the lower the initial detection sensitivity. The initial detection sensitivity preferably falls in a predetermined range. If the initial detection sensitivity is too low, the detection may be insufficient, meanwhile if the initial detection sensitivity is too high, even a very small load not expected to be sensed may be detected, possibly causing misdetection.

First Embodiment

A pressure sensitive element 100 and a pressure sensor 200 of a first embodiment will be explained next, referring to FIG. 1, FIG. 2A and FIG. 2B. First, the pressure sensitive element 100 and the pressure sensor 200 of this embodiment will be outlined. Although the description below will occasionally be made while designating the upper side and lower side of FIG. 2A and FIG. 2B as the upper side and lower side of the pressure sensitive element 100 or the pressure sensor 200, such directionality does not always correspond to the top and bottom in the vertical direction when the pressure sensitive element 100 and the pressure sensor 200 are manufactured or used.

The pressure sensitive element 100 of this embodiment has a support substrate 11, a conductor pattern 12e (sensor electrode 12), a pressure sensing film 14 and an insulating layer 13. The conductor pattern has electro-conductivity, and is supported on the support substrate 11. Although the conductor pattern in this embodiment is exemplified by a conductor pattern embodied to have the sensor electrode 12 only, the conductor pattern may be composed of the sensor electrode 12 and a dummy electrode 40, as described later in the third embodiment. The pressure sensing film 14 is arranged opposing to the conductor pattern (sensor electrode 12). The insulating layer 13 has an opening 20, and is provided between the support substrate 11 and the pressure sensing film 14.

Figure 2A:
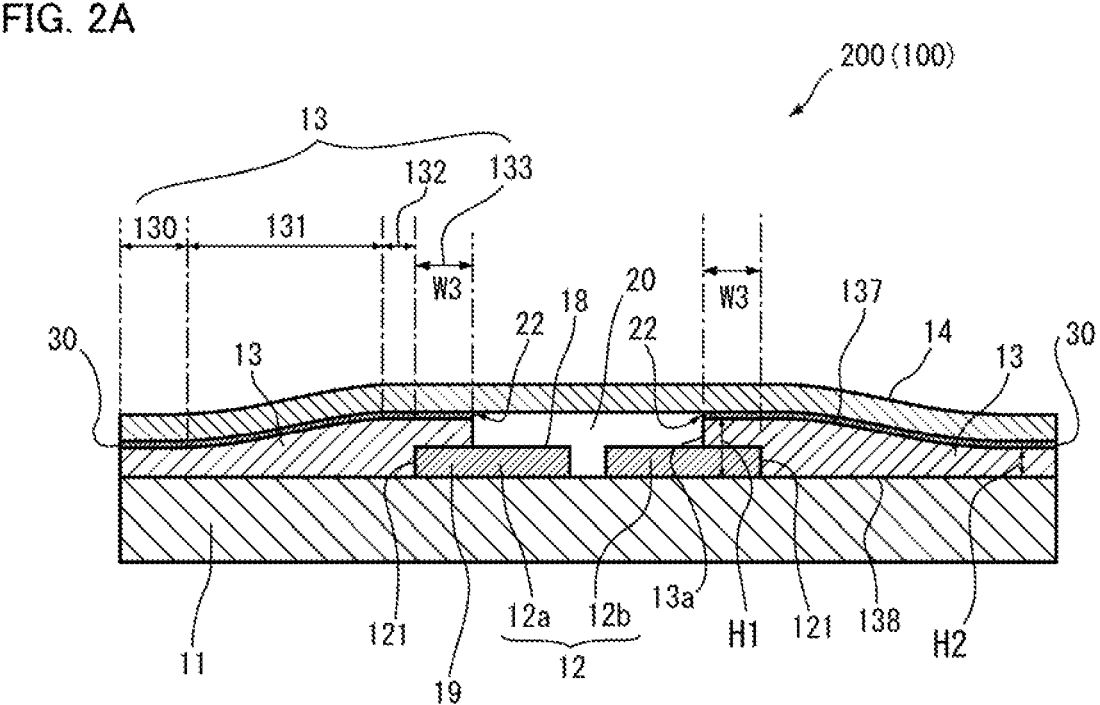
FIG. 2A is a cross-sectional view taken along line I-I in FIG. 1.
Figure 2B:
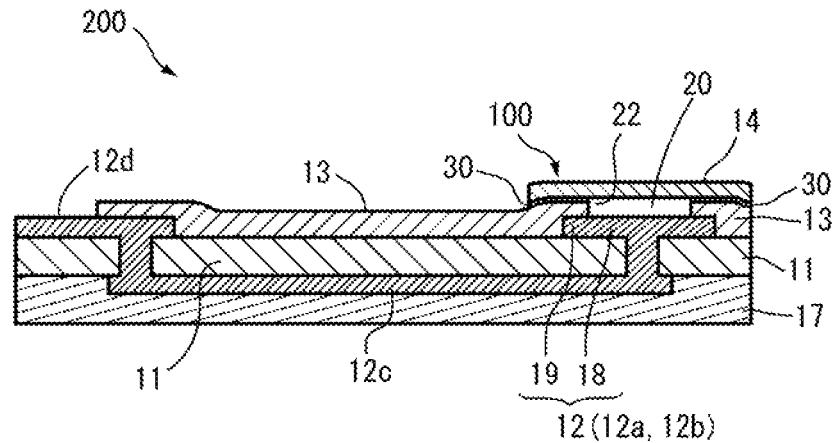
FIG. 2B is a cross-sectional view taken along line II-II in FIG. 1.

As illustrated in FIG. 1, FIG. 2A and FIG. 2B, in the pressure sensitive element 100 of this embodiment, at least a part of the opening edge 22 of the opening 20 is provided above and falls on the conductor pattern (sensor electrode 12). An exposed part 18 which is a part of the conductor pattern (sensor electrode 12) is exposed inside the opening 20, leaving a buried part 19 which is the residual part of the conductor pattern (sensor electrode 12) is buried under the insulating layer 13.

As illustrated in FIG. 1, the pressure sensor 200 has the pressure sensitive element 100, and a detection unit 210 electrically connected to the pressure sensitive element 100. As described above, the conductor pattern in this embodiment is the sensor electrode 12, and the sensor electrode 12 has connected thereto lead-out lines 12c. At least a part of the opening edge 22 of the opening 20 falls on the sensor electrode 12. The detection unit 210 detects electrical characteristic of the pressure sensitive element 100, which varies depending on contact resistance between the pressure sensing film 14 and the sensor electrode 12.

This embodiment will further be detailed next. The pressure sensitive element 100 is a device whose measurable electrical characteristic varies depending on load given by external pressurizing force. More specifically, contact resistance between the pressure sensing film 14 and the sensor electrode 12 varies depending on the external pressurizing force. A first electrode 12a and a second electrode 12b illustrated in FIG. 1 are connected to an unillustrated voltage supply unit. In the initial state, as illustrated in FIG. 2A and FIG. 2B, the pressure sensing film 14 and the sensor electrode 12 are kept apart, and kept electrically isolated. When the pressure sensing film 14 is applied with an external pressurizing force (from the upper side of the drawing), it causes flexure deformation towards the sensor electrode 12 and comes into contact with the first electrode 12a and the second electrode 12b. The pressure sensing film 14 has an electroconductive property over the entire portion thereof, or at least at a portion thereof opposing to the part (exposed part 18) of the conductor pattern (sensor electrode 12). Accordingly, as a result of physical contact of the pressure sensing film 14 with the sensor electrode 12 (first electrode 12a and second electrode 12b), the first electrode 12a and the pressure sensing film 14, and the pressure sensing film 14 and the second electrode 12b are electrically connected respectively, while producing a predetermined contact resistance. In this way, the first electrode 12a and the second electrode 12b are electrically connected.

The contact resistance and the amount of change thereof in the pressure sensitive element 100 correlate with the pressurizing force. The pressure sensor 200 of this embodiment quantifies the externally applied pressurizing force, by quantitatively detecting the contact resistance in the pressure sensitive element 100.

The pressure sensor 200 of this embodiment is excellent in flexibility, high sensitiveness, and electrical reliability, thus may be used for various applications. For example, the pressure sensitive element 100 may be attached to the surface of an arbitrary article, and may be used for a simple measurement for detecting pressure applied to the surface. In particular, the pressure sensitive element 100 may be attached to a curved surface such as bent surface or spherical surface, to enable thereon touch operation, and may further be configured to execute various functions switched over based on the magnitude of pressurizing force. It may be used not only to enable touch operation on a two-dimensional plane, like on the conventional touch panels, but is also applicable to electronic whiteboard or electronic paper to be used as an interface enabling three-dimensional input.

The detection unit 210 provided to the pressure sensor 200 properly contains an unillustrated voltage supply unit including a power source, and also an unillustrated processing unit which calculates the pressurizing force applied through the pressure sensing film 14 to the sensor electrode 12. The sensor electrode 12 in this embodiment is composed of a combination of the first electrode 12a and the second electrode 12b, which are electrically connected when pressurizing force is applied through the pressure sensing film 14 to the sensor electrode 12, and thereby electric current flows in the lead-out line 12c.

The pressure sensitive element of this embodiment 100 is a one-channel type element having a single pressure sensor unit which is composed of a single set of sensor electrode 12 and the pressure sensing film 14. Note that the pressure sensitive element 100 may alternatively be a multi-channel type element having a plurality of pressure sensor units, each of which being composed of the sensor electrode 12 combined with the pressure sensing film 14.

The support substrate 11 is not specifically limited so long as it can support the sensor electrode 12 in this embodiment. For example, in place of the film-like support substrate 11 used in this embodiment, any other arbitrary article having a form other than film may be used as the support substrate 11.

The support substrate 11 in this embodiment is a flexible insulating film. Materials for composing the insulating film are exemplified by, but not limited to, polyethylene, polyethylene terephthalate, polyethylene naphthalate, cycloolefin polymer, polycarbonate, aramid resin, polyimide, polyimide varnish, polyamide-imide, polyamide-imide varnish, and flexible sheet glass.

Considering the durability at high temperatures in an environment of use of the pressure sensor 200, the material for composing the support substrate 11 is more preferably selectable from highly heat resistant materials including polycarbonate, aramid film, polyimide, polyimide varnish, polyamide-imide, polyamide-imide varnish, and flexible sheet glass. For a typical case where soldering or similar process is employed for manufacturing the pressure sensor 200, the material for composing the support substrate 11 is more preferably polyimide film, polyimide varnish film, polyamide-imide film or polyamide-imide varnish film.

The support substrate 11 is not limited to the film-like one, but may have a variety of thicknesses. The thickness of the support substrate 11 may typically, but not limitatively, fall in the range from 12.5 μm to 50 μm, both ends inclusive. With the thickness controlled at or above 12.5 μm, the support substrate 11 will demonstrate a good durability during manufacturing or usage of the pressure sensor 200, meanwhile with the thickness controlled at or below 50 μm, it will demonstrate a good flexibility. The support substrate 11 may be preliminarily formed into a film as described above; or may be formed by casting or coating, for example, a polyimide-based insulating varnish, typically on a copper foil as a material for composing the sensor electrode 12. For example, from the viewpoint of improving both of durability and high sensitivity property of the pressure sensitive element 100, it is preferable to design the support substrate 11 thicker than the pressure sensing film.

The sensor electrode 12 is composed of a pair of electrodes arranged side by side in the in-plane direction while placing a predetermined space in between. The sensor electrode 12 is formed into a desired pattern on the support substrate 11. As illustrated in FIG. 1, the sensor electrode 12 in this embodiment has the paired first electrode 12a and the second electrode 12b. Each of the first electrode 12a and the second electrode 12b has a rectangular shape, and are juxtaposed side by side while placing a predetermined space in between.

The gap between the adjacent first electrode 12a and the second electrode 12b is not specifically limited. When the distance between the opposing sensor electrode 12 and the pressure sensing film 14 is 5 μm or larger and 25 μm or smaller, the gap between the first electrode 12a and the second electrode 12b may be controlled to 50 μm or larger and 500 μm or smaller. With such control, a desired level of pressure sensitive characteristic and stability in the manufacture may be well balanced.

The sensor electrode 12 is composed of an electroconductive member. In this embodiment, the sensor electrode 12 is composed of a low resistivity metal material. In this embodiment, the sensor electrode 12 has a surface resistivity smaller than that of the pressure sensing film 14. More specifically, the sensor electrode 12 is preferably, but not limitatively, formed by using copper, silver, metal material containing copper of silver, or aluminum. The sensor electrode 12 may also be formed by using a metal foil or metal paste.

The sensor electrode 12 may have any shape without special limitation. The sensor electrode 12 (first electrode 12a and second electrode 12b), formed to be rectangular in this embodiment, may alternatively be an arbitrary shape including concentric, spiral and comb-like shape. The sensor electrode 12 may alternatively be composed of a single strip, in place of the paired configuration arranged on the support substrate 11 as in this embodiment. The pressure sensing film 14 may have formed therein a pressure sensing resistor, to which the sensor electrode 12 may be electrically connected. In this case, it is recommendable to provide the lead-out lines 12c respectively to the sensor electrode 12 and the pressure sensing film 14.

Method of forming the sensor electrode 12 is not specifically limited. For example, the sensor electrode 12 may be formed by using a copper clad laminate (CCL) and by patterning it based on a photolithographic and etching technique. In the process of patterning, the lead-out line 12c or an external terminal electrode 12d described later may be formed concurrently. The CCL may be any of a laminate obtained by bonding a copper foil having a desired thickness to the support substrate 11 using an adhesive or tacky agent; a laminate obtained by casting or coating, on a copper foil, a varnish composed of an insulating resin; and a laminate obtained by forming on the support substrate 11 a copper foil by wet plating. The thickness of the copper foil used as described above is freely, but not limitatively, selectable in the range from 9 μm or thicker and 35 μm or thinner, which has been used typically in the technical field of flexible printed circuit (FPC), thereby improving a finish of the sensor electrode 12. In place of the copper foil, an aluminum foil or silver paste may be used for manufacturing the sensor electrode 12.

The top face of the sensor electrode 12, that is, the face opposed to the pressure sensing film 14 may be plated. Not only the top face of the sensor electrode 12, but also the outer circumferential end face may be plated. With the plating, the sensor electrode 12 may be prevented from being oxidized or degraded, and also may be improved in the wear resistance or keystroke resistance under repetitive pressurizing through the pressure sensing film 14. The plating may be given during or after the process of forming the sensor electrode 12. The plating is specifically, but not limitatively, exemplified by nickel plating with a thickness of 2 μm or more and 10 μm or less, and gold plating with a thickness of 0.02 μm or more and 2 μm or less.

The thickness of the sensor electrode 12 (including the thickness of a plated layer) typically, but not limitatively, falls in the range from 10 μm to 45 μm, both ends inclusive, from the practical point of view.

The first electrode 12a and the second electrode 12b have the lead-out lines 12c respectively connected thereto. The lead-out lines 12c in this embodiment are formed integrally with the first electrode 12a and the second electrode 12b, and are drawing out to an external terminal electrode 12d. The external terminal electrode 12d is connected via a flexible interconnect 202 to the detection unit 210.

As illustrated in FIG. 2B, a part of, or all of the lead-out lines 12c are drawn through a through-hole (TH) out onto the back face of the support substrate 11, which is opposite to the top face having the electrode 12 formed thereon. The support substrate 11 is a double-sided substrate. The lead-out line 12c once drawn out onto the back face is again drawn through another through hole (TH) on near side of the external terminal electrode 12d, out onto the top face having the sensor electrode 12 formed thereon. The double-sided substrate can deal with complication of the lead-out line 12c, when a so-called arrayed pressure sensor is configured by providing a plurality of sensor electrodes 12 on a single support substrate 11. As illustrated in FIG. 2B, on the back face of the support substrate 11, a cover 17 is optionally provided so as to cover and protect the lead-out line 12c drawn out onto the back face. The cover 17 is exemplified by, but not limited to, a cover film made of resin typically used as a protective film.

Note however that, in place of such double-sided substrate, usable is a single-sided substrate on which the lead-out line 12c is formed on the same face having the sensor electrode 12 formed thereon.

The insulating layer 13 is a spacer which creates a predetermined gap for keeping the sensor electrode 12 and the pressure sensing film 14 apart from each other. Owing to the spacer function of the insulating layer 13, the sensor electrode 12 and the pressure sensing film 14 are prevented from short-circuiting, in the initial state where the pressure sensitive element 100 is placed on a flat surface. The opening 20 formed in the insulating layer 13 is a hollow space which penetrates the insulating layer 13, in which an exposed part 18 of the sensor electrode 12 is exposed and opposed to the pressure sensing film 14, allowing the pressure sensing film 14 to come into contact with the sensor electrode 12 (exposed part 18). As illustrated in FIG. 2A, an opening edge 22 is formed by the opening wall face 13a which marks out the opening 20.

The insulating layer 13 is provided on the top face of the support substrate 11 having the sensor electrode 12 formed thereon. The support substrate 11 and the pressure sensing film 14 described later are stacked while placing the insulating layer 13 in between. The insulating layer 13 covers almost entire area of the support substrate 11 and the lead-out line 12c (see FIG. 2A and FIG. 2B), excluding the area of the opening 20 formed above the sensor electrode 12.

The insulating layer 13 is formed continuously over the support substrate 11 and the conductor pattern (sensor electrode 12). The level of height of the top face of the insulating layer 13 measured from the support substrate 11 is higher above the conductor pattern (=height H1), than above the support substrate (=height H2). The insulating layer 13 is formed so as to climb from the surface of the support substrate 11, up onto the top face of the sensor electrode 12. The opening 20 in this embodiment is arranged so as to fall across the first electrode 12a and the second electrode 12b. A part of the opening edge 22 falls on the first electrode 12a, and other part of the opening edge 22 falls on the second electrode 12b. With this arrangement, it now becomes possible to precisely control the thickness of the insulating layer 13 (overlapped part 133) respectively over the first electrode 12a and the second electrode 12b, and to arrange the pressure sensing film 14 precisely in parallel to the sensor electrode 12.

The insulating layer 13 has, on the outside of the conductor pattern (sensor electrode 12), a ramp 131 whose thickness increases towards the conductor pattern (sensor electrode 12), and a constant-thickness part 132, whose thickness being kept nearly constant, located between the ramp 131 and the conductor pattern (sensor electrode 12). The insulating layer 13 also has, on the further outside of the ramp 131 (left hand side of FIG. 2A), an outer circumferential part 130 whose thickness is smaller than that of the constant-thickness part 132 and is nearly constant. The insulating layer 13 (overlapped part 133) is formed, on the conductor pattern (sensor electrode 12), with a nearly constant thickness smaller than that of the constant-thickness part 132.

The top face of the insulating layer 13, that is, the surface on the opposite side relative to the support substrate 11, lies continuously over the outer circumferential part 130, the ramp 131, the constant-thickness part 132 and the overlapped part 133. The thickness of the insulating layer 13 increases from the outer circumferential part 130 towards the ramp 131 and the constant-thickness part 132. In other words, the thickness continuously increases towards the opening 20. The outer circumferential part 130 and the overlapped part 133 have a nearly equal thickness. That is, the overlapped part 133 formed on the sensor electrode 12 is the thinnest portion of the insulating layer 13, as well as the outer circumferential part 130.

The thickness of the insulating layer 13 (overlapped part 133) at the opening edge 22 is preferably, but not specifically limited to, 5 μm or larger and 30 μm or smaller. With the thickness of the insulating layer 13 (overlapped part 133) measured from the top face of the sensor electrode 12 controlled to 5 μm or larger, the pressure sensitive element 100 is successfully prevented from causing short-circuiting if it is bent or folded. Meanwhile, with the thickness of the overlapped part 133 controlled to 30 μm or smaller, the pressure sensitive element 100 may be thinned as a whole, and allows the pressure sensing film 14, deflected under external pressurizing force, to come into contact with sensor electrode 12 easily, successfully reducing the initial load for pressure sensing.

The thickness of the insulating layer 13 (overlapped part 133) on the conductor pattern (sensor electrode 12) may be set not larger than the thickness of the conductor pattern (sensor electrode 12). In the conventional pressure sensor described in Patent Documents 1 to 3, since the spacer has been provided on the top face of the support substrate, so that it has been inevitably necessary to form the spacer thicker than the sensor electrode, and to support thereon the pressure sensing film. The thickness of the spacer has therefore been controlled only with difficulty. In contrast, by forming the spacer (insulating layer 13) on the sensor electrode 12 as in the pressure sensor 200 of this embodiment, the thickness of the insulating layer 13, which affects the initial load for pressure sensing, may be extremely reduced to approximately 5 μm or above, at around the opening edge 22 (that is, at the overlapped part 133). In this way, the thickness of the insulating layer 13 may be controlled precisely and easily.

The constant-thickness part 132 is a partial area of the insulating layer 13, having the level of height, measured from the surface of the support substrate 11, nearly equal to height H1 of the overlapped part 133, and formed outside the sensor electrode 12 but directly on the support substrate 11. Accordingly, the constant-thickness part 132 has a thickness of H1, and forms the thickest part of the insulating layer 13.

The insulating layer 13 may be formed by any method not specifically limited, and typically by photolithography. More specifically, a photosensitive material is coated by printing over the support substrate 11 having the sensor electrode 12 preliminarily formed thereon, and the coated layer is exposed to light and developed, to precisely form the opening 20. Accordingly, the insulating layer 13 is preferably composed of a photo-curable resin. The photo-sensitive material may be coated preferably by screen printing.

The photo-sensitive material for composing the insulating layer 13 is exemplified by epoxy-based resin, given a proper level of flexibility by a known method such as urethane modification. By using such epoxy-based resin, the insulating layer 13 having a proper level of flexibility, and heat resistance enough to endure reflow process, may be formed.

The aperture of the opening 20 may be determined properly without special limitation, without departing from the spirit of this invention. For example, longitudinal dimension W1 and transverse dimension W2 of the opening 20 illustrated in FIG. 1 may be 1 mm or longer and 10 mm or shorter.

As illustrated in FIG. 1, the opening edge 22 of the opening 20 of this embodiment has a polygonal shape with a plurality of sides, and more specifically has a rectangular shape. Of the plurality of sides composing the polygonal shape of the opening edge 22, at least one side, throughout the full length thereof, falls on the sensor electrode 12 as the conductor pattern. In this embodiment, a pair of sides 221, 222 composing the rectangular opening edge 22, over the individual full lengths thereof, fall on the first electrode 12a and the second electrode 12b, respectively.

The opening edge 22 of the opening 20 is located between the center and the outer edge 121 of the conductor pattern (first electrode 12a, second electrode 12b). Accordingly, when the conductor pattern, which corresponds to an underlying layer of the overlapped part 133 of the insulating layer 13, is the sensor electrode 12 (first electrode 12a, second electrode 12b), then the exposed part 18 to be brought into contact with the pressure sensing film 14 will be given a sufficiently large area.

More specifically, distance W3 (see FIG. 2A) between the opening edge 22 of the opening 20 and the outer edge 121 of the conductor pattern (first electrode 12a, second electrode 12b) is typically set to 50 μm or longer. With such distance, it becomes always possible to make the opening edge 22 of the opening 20 exactly fall on the conductor pattern, taking allowance for misalignment of an exposure mask, used when the insulating layer 13 is formed by photolithography, into consideration.

As illustrated in FIG. 1, as a result of stacking of the insulating layer 13, having the opening 20 formed therein, with the pressure sensing film 14, the opening 20 forms a hollow space in which the pressure sensing film 14 can deflect. The insulating layer 13 may be provided with a vent hole 112 through which the opening 20 can communicate with the external of the pressure sensitive element 100. With the vent hole 112, it is now possible to eliminate pressure difference between the external pressure outside the pressure sensitive element 100 and the internal pressure of the opening 20. The aperture of the vent hole 112 is typically, but not specifically limited to, 50 μm or larger and 500 μm or smaller, enough to demonstrate a sufficient level of pressure regulating function. It is also possible to make the height of the vent hole 112 and the thickness of the insulating layer 13 nearly equal, so as to allow concurrent formation of the opening 20 and the vent hole 112. The insulating layer 13 may alternatively be made using a highly breathable insulating material. In this way, the pressure regulating function for the inside of the opening 20 may be obtained without forming the vent hole 112.

On the top face of the insulating layer 13, there is stacked the pressure sensing film 14. The insulating layer 13 and the pressure sensing film 14 in this embodiment are bonded to each other, while placing an adhesive layer 30 in between. The adhesive layer 30 may be formed using any material, including tacky agent, adhesive, tacky sheet and adhesive sheet, so long as it can bond the insulating layer 13 and the pressure sensing film 14. The adhesive layer 30 is preferably formed to have a nearly equal shape with the insulating layer, so as not to adversely affect the contact resistance between the sensor electrode 12 and the pressure sensing film 14, and so as not to substantially get in the opening 20. The adhesive layer 30 may alternatively be provided on either one of the insulating layer 13 and the pressure sensing film 14, and then the other is aligned and bonded to the one having the adhesive layer 30 formed thereon.

The surface (top face 137) of the insulating layer 13, faced to the pressure sensing film 14, and the pressure sensing film 14 are fixed to each other while placing the adhesive layer 30 in between. Meanwhile, the surface (back face 138) of the insulating layer 13, faced to the support substrate 11, is bonded to the support substrate 11, while placing no adhesive layer in between. Such embodiment is obtained by forming by printing the insulating layer 13 directly onto the support substrate 11. By forming by printing the insulating layer 13 directly onto the support substrate 11, misalignment of film anticipated in the process of bonding may be reduced distinctively, and thereby the pressure sensitive element 100 may be manufactured in a high yield. Since the pressure sensing film 14 is entirely, or entirely at least over the back face, given an electroconductive property, so that it is no more necessary to precisely align the pressure sensing film 14 to the insulating layer 13. Accordingly, even when the pressure sensing film 14 and the insulating layer 13 are bonded using the adhesive layer 30, the pressure sensitive element 100 may be manufactured without degrading the yield ratio.

The pressure sensing film 14 is a component which comes into contact with the sensor electrode 12, to thereby electrically connect the paired first electrode 12a and second electrode 12b composing the sensor electrode 12. "The pressure sensing film 14 has an electroconductive property" means that the pressure sensing film 14 is electro-conductive enough to allow electric current to flow therethrough when externally pressed. More specifically, as a result of contact of the pressure sensing film 14 externally loaded with pressurizing force, with the first electrode 12a and the second electrode 12b so as to bridge them, the first electrode 12a and the second electrode 12b are electrically connected.

For the pressure sensing film 14 in this embodiment, a resin film containing carbon particle may typically be used. Owing to that the resin film per se has the electroconductive property, the pressure sensing film 14 may be thinned, and may be improved in flexibility. As a modified example of the pressure sensing film 14, also acceptable is an insulating resin film having, formed in a predetermined area on the surface (back face) thereof, a pressure sensing resistor made of an electroconductive material. The pressure sensing resistor may be obtained by coating by printing a carbon paste on the resin film, or by depositing by evaporation a semiconductor material such as copper sulfide or copper oxide.

Resin composing the pressure sensing film 14 is exemplified by polyesters such as polyethylene terephthalate and polyethylene naphthalate; cyclic polyolefins; polycarbonate; polyimide; polyamide-imide; and liquid crystal polymer. Among these resins, only a single resin may be used, or a plurality of resins may be used in combination to configure the pressure sensing film 14.

From the viewpoint of imparting heat resistance suitable for the pressure sensitive element 100, the pressure sensing film 14 preferably employs polyimide or polyamide-imide as the major constituent. Resin using polyimide or polyamide-imide as the major constituent can exhibit a heat resistance of 260° C. or higher. Now the major constituent means a material whose content is 50% by mass or more, preferably 70% by mass or more, and particularly 90% by mass or more of the resin composing the resin film. The pressure sensing film 14 preferably has a Young's modulus of 5 GPa or smaller. With these specifications, the pressure sensing film 14 will have a satisfactory level of flexibility.

The carbon particle contained in the pressure sensing film 14 is a conducting agent, and is exemplified by carbon blacks such as acethylene black, furnace black (Ketjenblack), channel black and thermal black; and particulate carbon materials such as graphite. Only a single species of these carbon materials may be used independently, or two or more species may be used in combination.

Content of the carbon particle in the pressure sensing film 14, and, shape and particle size of the carbon particle are not specifically limited without departing from the spirit of this invention. These matters may be properly determined, so long as the pressure sensing film 14 can induce electrical conduction in the sensor electrode 12, depending on the contact resistance produced when it comes into contact with the sensor electrode 12.

The pressure sensing film 14 preferably has a thickness of 6.5 µm or thicker and 40 µm or thinner. With the thickness controlled to 6.5 µm or thicker, the pressure sensing film 14 will have an improved durability. Meanwhile, with the thickness controlled to 40 µm or thinner, the initial detection sensitivity upon pressing of the pressure sensing film 14 will be improved. The thickness of the pressure sensing film 14 may be measured by using a typical height gauge, upright gauge or other thickness measuring means.

The pressure sensing film 14 preferably has a surface resistivity of 7 kΩ/sq or larger and 30 kΩ/sq or smaller. With the surface resistivity controlled within the range, the pressure sensing film 14 will have a high electrical reliability, showing only a small dispersion in resistivity when placed under heavy load. More specifically, the pressure sensitive element 100 may be designed to have the initial detection sensitivity in a high sensitivity range typically at 0.25 MPa or below, and further 0.17 MPa or below, with a moderate gradient of sensor output from the initial load for pressure sensing, up to the maximum load.

In a filmy article such as the pressure sensing film 14, electric current flows mainly along the surface of the filmy article. For this reason, the resistivity of filmy article in this specification is defined by sheet resistance per unit area, ignoring the thickness, and is specifically denoted in Ω/☐ or Ω/sq. The surface resistivity of the pressure sensing film 14 may be measured using a popular surface resistivity meter. This sort of popular surface resistivity meter is exemplified by, but not limited to, four-probe resistivity meter, such as a resistivity meter available from Mitsubishi Chemical Analytech Co., Ltd.

The pressure sensitive element 100 may be adjusted so that the pressure sensing film 14 will have, on the surface thereof faced to the sensor electrode 12, a surface roughness Rz of 0.10 µm or larger and 0.50 µm or smaller. With such adjustment, the pressure sensing film 14 may be formed stably, and thereby detection sensitivity of contact resistance may be stabilized.

The surface roughness Rz of the pressure sensing film 14 may be measured using a well-known surface roughness tester, or may be analyzed under a laser microscope.

Figure 3A:
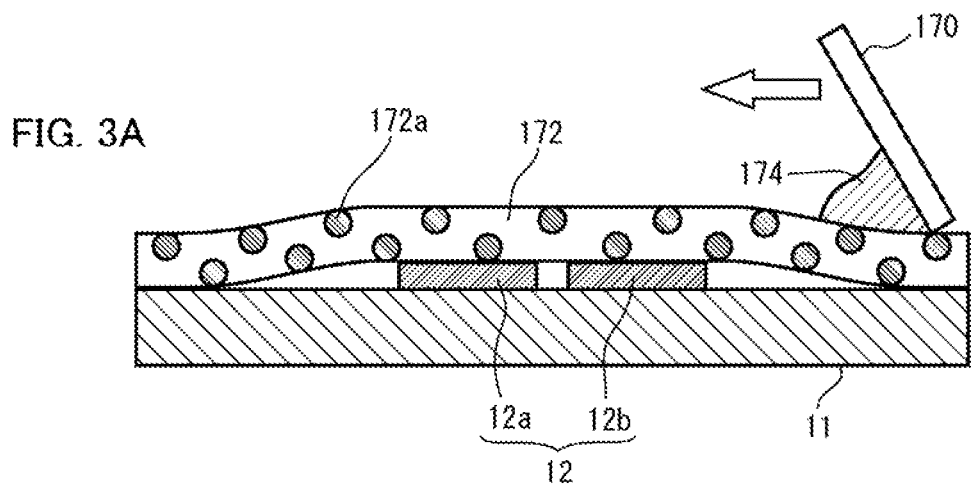
FIG. 3A to FIG. 3C are explanatory drawings for explaining steps of manufacturing a pressure sensitive element.
Figure 3B:
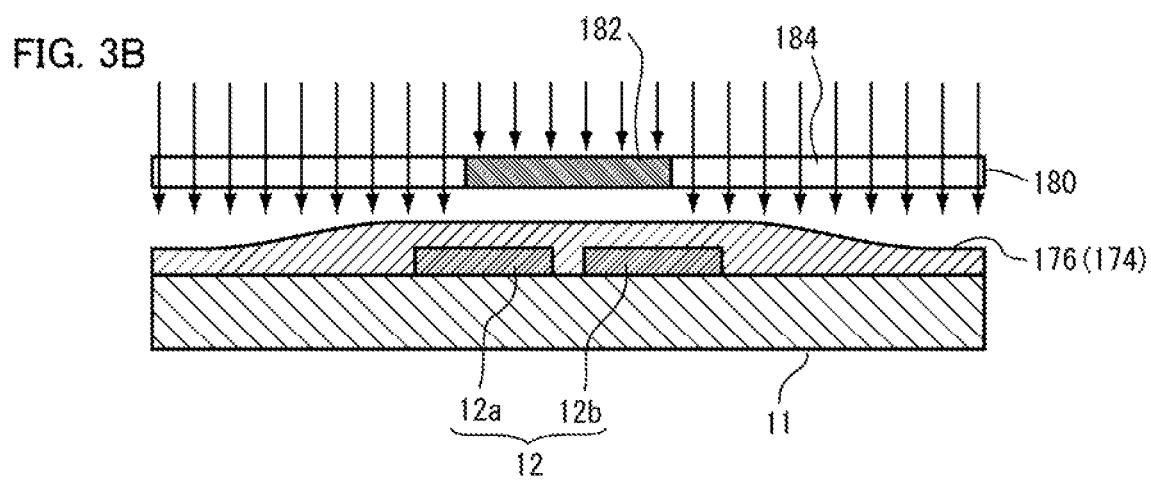
Figure 3C:
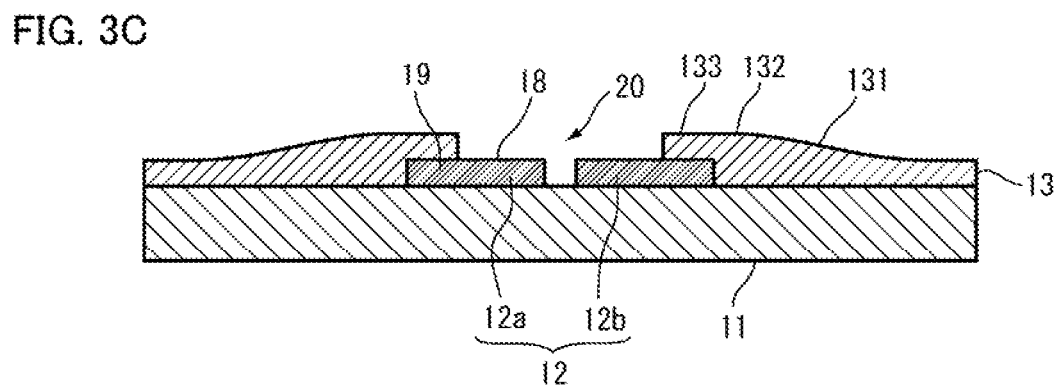

Steps of manufacturing the pressure sensitive element of this embodiment 100 (see FIG. 2A) (occasionally be referred to as "this method", hereinafter) will be explained below, referring to FIG. 3A to FIG. 3C. FIG. 3A to FIG. 3C are partial cross-sectional views of the support substrate 11 and other layers, taken in the direction of the normal line. FIG. 3A illustrates a step of coating a photosensitive coating material 174 by screen printing, over the support substrate 11 having the sensor electrode 12 formed thereon. FIG. 3B illustrates a state of coating of the photosensitive coating material 174 over the support substrate 11, followed by light exposure. FIG. 3C illustrates a state of forming the insulating layer 13 with the opening 20, by way of light exposure and development.

This method employs well known steps of screen printing and photolithography to manufacture the pressure sensitive element 100. In the pressure sensitive element 100 manufactured by this method, the overlapped part 133 as a part of the insulating layer 13 is formed on the sensor electrode 12, and the ramp 131 is formed at around the outer circumferential part of the insulating layer 13. Referring now back to Patent Documents 1 to 3 where the spacer is formed apart from the outer circumferential part of the sensor electrode in the plan view, it has been difficult to control the height of the spacer when it was formed by screen printing, due to a slope produced in the spacer. What is worse, an alignment error of the exposure mask could occur in random directions, so that the height of the spacer would vary in all directions at around the sensor electrode 12. In contrast in the present method, by forming the insulating layer 13 so as to climb up onto the sensor electrode 12, such slope is avoidable at around the opening edge 22 of the opening 20, and thereby height H1 of the insulating layer 13 at that portion can precisely be controlled.

This method will be detailed next. Note that the steps explained below may properly be changed in the order, a part of the steps may properly be omitted, or a part of the steps may be modified.

First, a copper clad laminate (CCL) having a copper film formed on the support substrate 11 is prepared. For the provision of alignment possibly needed in the succeeding steps, a guide hole may be formed in the CCL. Next, the CCL is rinsed with an acid, a dry film is laminated to the CCL, subjected to patternwise exposure using an exposure apparatus, and then subjected to development using a developing apparatus. Thereby the dry film is patterned into the shapes of the sensor electrode 12, the lead-out line 12c and the external terminal electrode 12d (see FIG. 2B). The CCL having thereon the patterned dry film is subjected to etching so as to pattern the copper foil into a corresponding shape, to thereby form the sensor electrode 12, the lead-out line 12c and the external terminal electrode 12d on the support substrate 11. The sensor electrode 12 contains the first electrode 12a and the second electrode 12b. After the step of etching, the dry film remained on the surface of the patterned copper foil is removed by stripping, and optionally rinsed with water and subjected to rust-proofing treatment.

Next, as illustrated in FIG. 3A, a screen printing plate 172 is placed so as to cover the support substrate 11 and the sensor electrode 12. As a squeegee 170 continuously moves over the support substrate 11 and the sensor electrode 12, the screen printing plate 172 climbs up onto the sensor electrode 12, and is laid down on the support substrate 11 at a position approximately 1 mm away from the sensor electrode 12. At around the outer circumferential part of the sensor electrode 12, the screen printing plate 172 is placed so as to slope down as it goes away from the sensor electrode 12. In accordance with such slope, the ramp 131 (see FIG. 3C) is formed in the insulating layer 13.

Then the photosensitive coating material 174 is coated using the squeegee 170 to a predetermined thickness, and allowed to dry, to thereby form a photosensitive coated film 176 as illustrated in FIG. 3B. The photosensitive coated film 176 has the thickness increased at the site where the sensor electrode 12 is formed, and continuously thinned as it goes away from the sensor electrode 12. The photosensitive coated film 176 is formed so as to cover the entire portion of the sensor electrode 12.

The screen printing plate 172 suitably used herein is exemplified by, but not limited to, polyester mesh having a mesh count of #120 (general-purpose product), and 3D woven stainless steel mesh having a mesh count of #165 (3D-165-126, from Asada Mesh Co., Ltd.). After the photosensitive coating material 174 was coated, the support substrate 11 having coated thereon the photosensitive coating material 174 may be allowed to stand at normal temperature for a predetermined length of time, so that the photosensitive coating material 174 may be fully leveled and made flat on the sensor electrode 12. In this way, owing to the uniform thickness of the sensor electrode 12, the photosensitive coating material 174 may be made flat and have a uniform thickness on the sensor electrode 12.

The photosensitive coated film 176 obtained after drying the photosensitive coating material 174 is then exposed to light, through an exposure mask arranged opposing thereto. The exposure mask 180 has a shadowing part 182 corresponding to an area where the opening 20 (see FIG. 3C) is planned to be formed, and has a transmissive part 184 in the residual area. The shadowing part 182 is aligned, in a plan view, so as to extend over the first electrode 12a and the second electrode 12b, and to fall inside the contour of the sensor electrode 12. Also the shadowing part 182 is formed in an area corresponded to the vent hole 112 (see FIG. 1). In the step of light exposure, the photosensitive coated film 176 is cured selectively in the area thereof opposing to the transmissive part 184. Next, the photosensitive coated film 176 is developed typically by using a weak alkali solution, to form therein the opening 20 as illustrated in FIG. 3C. As a consequence, the exposed part 18 of the sensor electrode 12 can be seen exposed in the opening 20, while leaving the buried part 19 buried under the overlapped part 133 of the insulating layer 13. On the support substrate 11, there is formed a ramp 131 whose thickness increases towards the sensor electrode 12, and between the ramp 131 and the overlapped part 133, there is formed a constant-thickness part 132 whose thickness is nearly constant. The development of the photosensitive coated film 176 may optionally be followed by annealing.

Of the sensor electrode 12, the lead-out line 12c and the external terminal electrode 12d provided on the support substrate 11, the exposed portions remained uncovered with the insulating layer 13 may be subjected to Ni/Au plating. The plating may rely upon electroplating or electroless plating at an arbitrary choice. The plating may succeed the patterning of the sensor electrode 12, the lead-out line 12c and the external terminal electrode 12d, or may precede the coating of the photosensitive coating material 174.

The adhesive layer 30 (see FIG. 2A) is then formed conforming to the shape of the insulating layer 13. The adhesive layer 30 may be formed by preparing an adhesive sheet which is punched at a portion corresponded to the opening 20, and by laminating the adhesive sheet to the surface of the insulating layer 13 while being aligned with the opening 20. Alternatively, the adhesive layer 30 may be formed by coating an adhesive on the insulating layer 13, by printing such as screen printing, through a screen printing plate aligned with the opening 20 formed in the insulating layer 13. Still alternatively, an adhesive sheet having been punched out at a portion corresponded to the opening 20 may be laminated to the pressure sensing film 14 (see FIG. 2A) to form the adhesive layer 30, and then bonding the adhesive layer 30 to the insulating layer 13. When the pressure sensing film 14 is laminated to the surface of the insulating layer 13, it is recommendable to use a vacuum press, and to laminate under heating the insulating layer 13 and the pressure sensing film 14 in vacuo, while placing the adhesive layer 30 in between. In this way, the lamination will be successful without letting air trapped between the layers.

The pressure sensitive element 100 illustrated in FIG. 2A may be thus manufactured. Thereafter, the pressure sensitive element 100 may be electrically connected to the detection unit 210, to manufacture the pressure sensor 200 (see FIG. 1).

In the pressure sensitive element of this embodiment 100, the overlapped part 133 with a uniform thickness is formed on the sensor electrode 12, and at the overlapped part 133, the insulating layer 13 has the largest level of height, measured from the support substrate 11, as well as the constant-thickness part 132. Accordingly, height H1 of the insulating layer 13 at around the opening edge 22, which affects the initial load for pressure sensing, may precisely be controlled. In particular, since in the pressure sensitive element of this embodiment 100, the opposing sides 221, 222 composing the opening edge 22 of the polygonal opening 20, throughout the full length of the sides thereof, fall on the sensor electrode 12, so that height H1 of the insulating layer 13 (overlapped part 133) may precisely be controlled along the entire circumference of the opening 20.

Although the embodiment described above dealt with an exemplary case where the sensor electrode 12 was provided only on one side of the support substrate 11, this invention is not limited thereto. The sensor electrode 12 and the pressure sensing film 14 may be provided on both surfaces of the support substrate 11.

Second Embodiment

Figure 4:
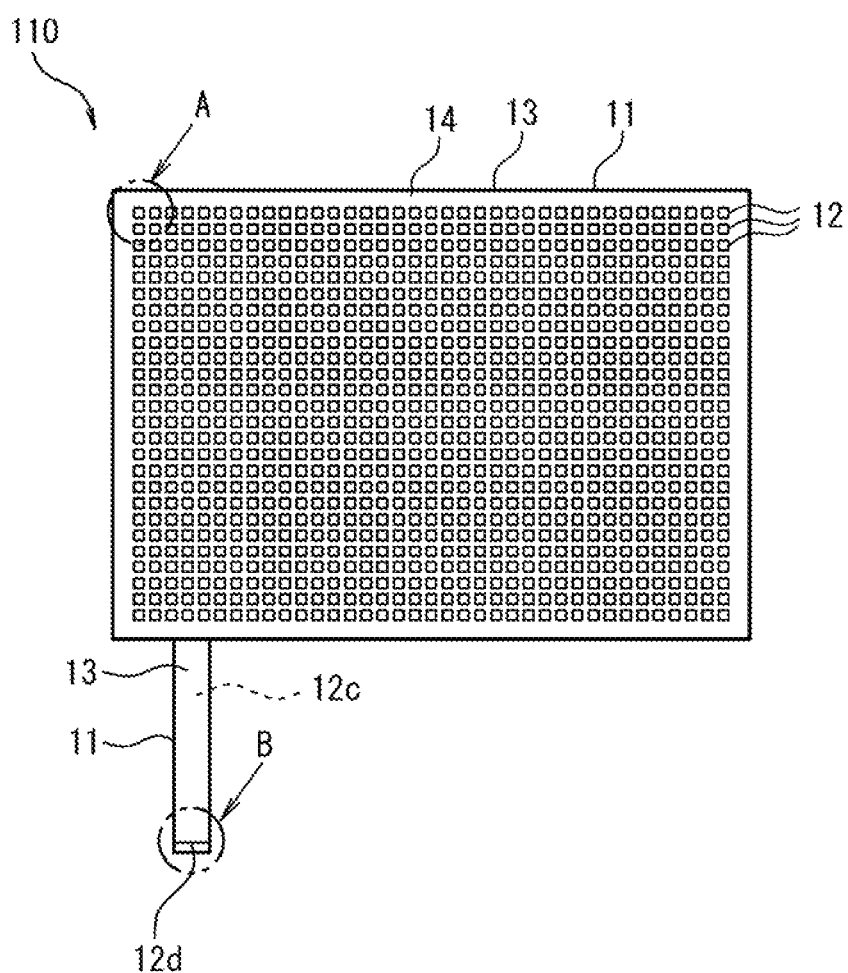
FIG. 4 is a plan view of a pressure sensitive element according to a second embodiment of this invention.
Figure 5A:
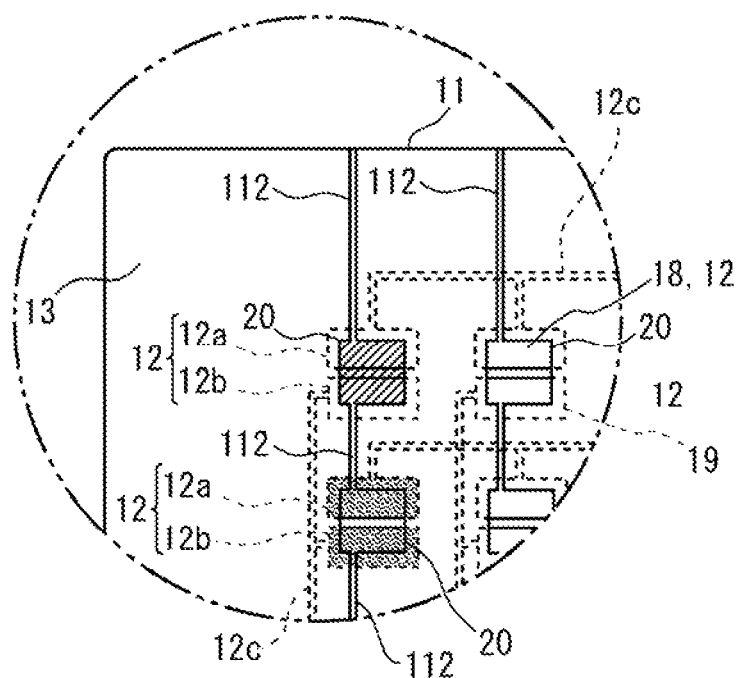
FIG. 5A is a partial enlarged view of area "A" in FIG. 4.
Figure 5B:
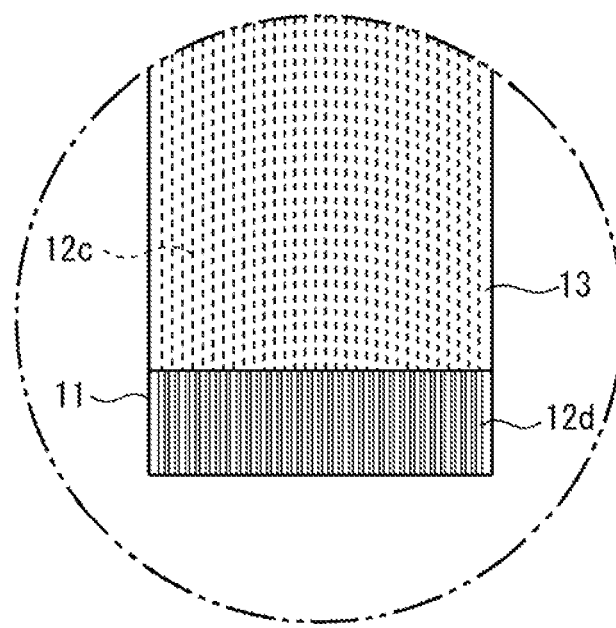
FIG. 5B is a partial enlarged view of area "B" in FIG. 4.

FIG. 4 is a plan view illustrating a pressure sensitive element 110 according to a second embodiment of this invention. FIG. 5A is a partial enlarged view of area "A" in FIG. 4, and FIG. 5B is a partial enlarged view of area "B" in FIG. 4. Note that the pressure sensing film 14 is not illustrated in FIG. 5A and FIG. 5B. For convenience sake, some of a plurality of openings 20 and sensor electrodes 12 are hatched.

The pressure sensitive element of this embodiment 110 is different from the pressure sensitive element 100 of the first embodiment (see FIG. 1), in that it is of multi-channel type having a plurality of sensor electrodes 12 provided to a single support substrate 11. Each sensor electrode 12 is a paired electrode composed of the first electrode 12a and the second electrode 12b, wherein the paired electrodes are arranged two-dimensionally. The sensor electrodes 12 may be arranged in a lattice, in a staggered manner, or in any other pattern such as a random pattern. The distance between every adjacent sensor electrodes 12 may properly be set depending on applications of the pressure sensitive element 110, typically to 1 mm or larger and 10 mm or smaller.

In the plan view illustrated in FIG. 5A, each opening 20 of the insulating layer 13 is arranged individually inside the contour of each sensor electrode 12, and each exposed part 18 of the sensor electrode 12 is exposed as seen in the opening 20.

A single pressure sensing film 14 is arranged opposing to the plurality of sensor electrodes 12. By configuring a plurality of pressure sensor units 15 by arranging a single pressure sensing film 14 opposing to the plurality of sensor electrodes 12, process load for patterning or alignment of the pressure sensing film 14 may be relieved, and also the configuration of the pressure sensitive element 110 may be simplified. Each of the first electrode 12a and the second electrode 12b composing each sensor electrode 12 has connected thereto the lead-out line 12c, through which voltage is applied from an unillustrated voltage supply unit. A large number of lead-out lines 12c are combined into a bundle as illustrated in FIG. 5B, and respectively connected to the external terminal electrode 12d. The pressure sensing film 14, when externally loaded with pressurizing force, comes into contact with the sensor electrodes 12 so as to bridge the first electrodes 12a and the second electrodes 12b, thereby the first electrodes 12a and the second electrodes 12b are electrically connected, allowing electric current to flow through the lead-out lines 12c.

Third Embodiment

Figure 6:
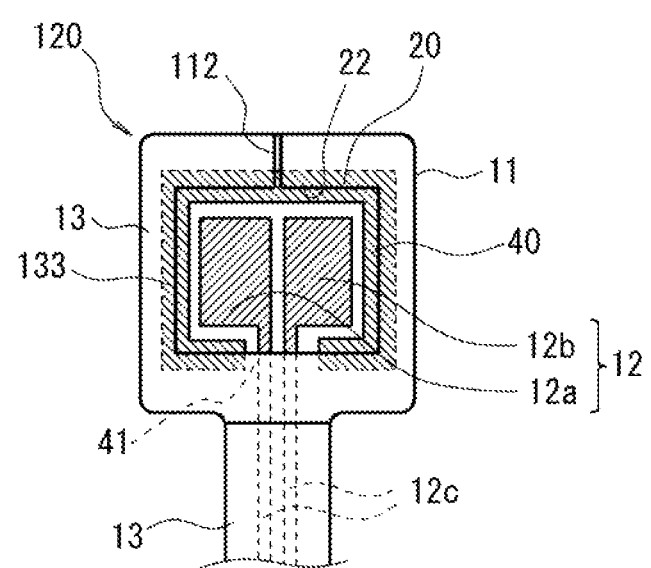
FIG. 6 is a plan view illustrating a pressure sensitive element according to a third embodiment of this invention.

FIG. 6 is a plan view illustrating a pressure sensitive element 120 according to a third embodiment of this invention. The pressure sensitive element of this embodiment 120 is different from the pressure sensitive element 100 of the first embodiment (see FIG. 1), in that it contains, as the conductor pattern, the sensor electrode 12 and a dummy electrode 40. For convenience sake, the sensor electrode 12 and the dummy electrode 40 are hatched in FIG. 6. The sensor electrodes 12 has connected thereto the lead-out line 12c, meanwhile the dummy electrode 40 has no lead-out line 12c connected thereto. The dummy electrode 40 is electrically isolated from the sensor electrode 12, but is formed in the same layer with the sensor electrode 12.

The dummy electrode 40 is formed in the above-described step of patterning of the sensor electrode 12 and the lead-out line 12c, concurrently with the sensor electrode 12 using the same material. The dummy electrode 40 in this embodiment is formed into an open ring shape so as to surround the sensor electrode 12, although not limited thereto. The lead-out line 12c is arranged through a cleft 41 of the dummy electrode 40.

At least a part of the opening edge 22 of the opening 20 falls on the dummy electrode 40. In this embodiment, the opening edge 22, throughout the full length thereof but excluding the vent hole 112, falls on the dummy electrode 40. In the pressure sensitive element 120 of this embodiment, the opening edge 22 of the insulating layer 13 falls on the dummy electrode 40, not on the sensor electrode 12. Accordingly, the thickness of the overlapped part 133 of the insulating layer 13 may precisely be controlled, making use of a uniform thickness of the dummy electrode 40. In this case, by using the dummy electrode 40, having been formed so as to externally surround the sensor electrode 12 and into a ring shape (including open ring shape) outside the sensor electrode 12, as an underlying layer of the insulating layer 13, it now becomes possible to expose the entire portion of the sensor electrode 12 (first electrode 12a and second electrode 12b) inside the opening 20. Accordingly, the pressure sensing film 14 (see FIG. 2A) and the sensor electrode 12 may be brought into contact over a wide area, and thereby the initial load for pressure sensing may be reduced.

This invention is not limited to the embodiments described above, instead allowing various modified or improved embodiments so long as the purpose of this invention will be achieved.

The pressure sensor of this invention is suitably applicable to measurement of pressure distribution over a flat surface, or various curved surfaces including spherical surface, in particular over a flexible curved surface having a small curvature which possibly changes dynamically, where small measurement error and high resolution are required.

The pressure sensor of this invention is also suitably applicable to measurement of pressure distribution of instruments having relatively large areas.

EXAMPLES

Figure 7:
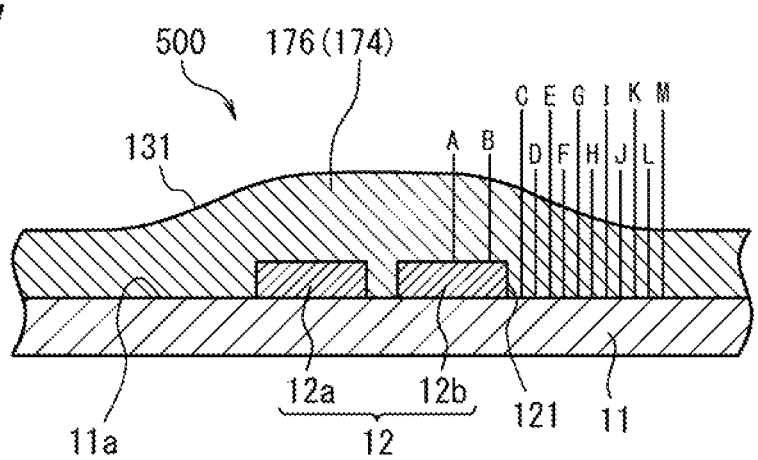
FIG. 7 is an explanatory drawing of a printed work used in Examples of this invention and Comparative Examples.

Examples of this invention and Comparative Examples will be described below. The individual Examples and Comparative Examples were manufactured according to the configuration of the pressure sensor 200 having the single-channel pressure sensitive element 100 illustrated in FIG. 1. In Examples, the height is defined to be measured from the surface 11a of the support substrate 11, having the sensor electrode 12 formed thereon, unless otherwise specifically noted. Examples properly refer to FIG. 1, FIG. 2, FIG. 3A to FIG. 3C, and FIG. 7. FIG. 7 is an explanatory drawing of a printed work 500, having formed thereon the photosensitive coated film 176, used in Examples of this invention and Comparative Examples.

First, as a component common to the individual Examples and Comparative Examples, manufactured was the support substrate 11 having formed thereon the sensor electrode 12 as described below (referred to as "printed work", hereinafter). A polyimide film (25 μm thick) was used as the support substrate 11, and thereon, the sensor electrode 12 composed of the paired first electrode 12a and second electrode 12b, the lead-out line 12c, and the external terminal electrode 12d were formed. The first electrode 12a and the second electrode 12b were 19 μm high.

Over the surface 11a of the support substrate 11, the photosensitive coated film 176 described below was formed by screen printing. More specifically, the screen printing plate 172, typically a 120-mesh (#120) polyester mesh, was placed on the surface 11a of the support substrate 11, so that, as a squeegee 170 moves continuously over the printed work 500, the screen printing plate 172 would climb up onto the sensor electrode 12, and would be laid down on the surface 11a of the support substrate 11 at around the sensor electrode 12 (see FIG. 3A). The squeegee 170 was moved along the screen printing plate 172 to coat the photosensitive coating material 174 on the printed work, and the screen printing plate 172 was then removed, to obtain the printed work 500 having the photosensitive coated film 176 formed thereon by coating the photosensitive coating material 174 (see FIG. 7).

The thus obtained printed work 500 having the photosensitive coated film 176 was embedded into an acrylic resin to prepare a test sample. The test sample was cut respectively at Positions A to M illustrated in FIG. 7, along the normal line, and polished on the cross-section, to prepare respective measurement samples. Position A is nearly at the center of the second electrode 12b, and Position B is on the second electrode 12b and in the vicinity of the outer edge 121. The distances between the sensor electrode 12 (the side face of the second electrode 12b) and each of Positions C to M are summarized in Table 1.

The cross-section of each measurement sample was observed under a measuring optical microscope. The thickness of the photosensitive coated film 176 was measured to the first decimal place, and the thus measured value was rounded to give the height of the photosensitive coated film 176. For the measurement of film thickness, 30 measurement samples were prepared for each Position, and the thickness of the photosensitive coated film 176 was measured at two points for each measurement sample, that is, 60 points in total. The thickness of the photosensitive coated film 176 at each of Positions A to M was determined as an average of the rounded measured values obtained from 60 points of measurement, and was denoted as thickness (a). Also values of thickness (b) found by subtracting the thickness of the sensor electrode (19 μm) from thickness (a) are summarized in Table 1.

Next, light exposure and development were conducted in Examples and Comparative Examples to form the insulating layer 13 having the opening 20, controlling so as to make the opening edge 22 respectively fall on Position A to Position

TABLE 1

| | | | Example 1 | Example 2 | Comparative Example 1 | Comparative Example 2 | Comparative Example 3 | Comparative Example 4 | Comparative Example 5 |
|---|---|---|---|---|---|---|---|---|---|
| Position | | | A | B | C | D | E | F | G |
| Distance from edge of sensor electrode [μm] | | | — | — | 50 | 150 | 250 | 350 | 450 |
| Height of sensor electrode [μm] | | | | | | 19 | | | |
| Height of photosensitive coated film—Thickness (a) [μm] | | Max. | 46 | 46 | 43 | 41 | 40 | 38 | 35 |
| | | Average | 45 | 45 | 43 | 39 | 39 | 37 | 35 |
| | | Min. | 45 | 45 | 42 | 39 | 37 | 37 | 34 |
| | | (Dispersion) | 1 | 1 | 1 | 2 | 3 | 1 | 1 |
| Difference of height of photosensitive coated film and height of sensor electrode—Thickness (b) [μm] | | Max. | 27 | 27 | 24 | 22 | 21 | 19 | 16 |
| | | Average | 26 | 26 | 24 | 20 | 20 | 18 | 16 |
| | | Min. | 26 | 26 | 23 | 20 | 18 | 18 | 15 |
| Evaluation of pressure sensing performance | Initial load for pressure sensing in flat state [N] | Max. | 0.58 | 0.52 | 0.46 | 0.43 | 0.39 | 0.37 | 0.33 |
| | | Min. | 0.47 | 0.43 | 0.40 | 0.38 | 0.32 | 0.32 | 0.27 |
| | Sensor Resistivity under heavy load [Ω] | Max. | 1920 | 1868 | 1788 | 1592 | 1523 | 1501 | 1402 |
| | | Min. | 1911 | 1859 | 1779 | 1576 | 1511 | 1478 | 1356 |
| | Dispersion range of sensor resistivity [Ω] | | 9 | 9 | 9 | 16 | 12 | 23 | 46 |
| | Yes/No of short-circuiting in bent state (φ 10 mm) | | No | No | No | No | No | No | No |

| | | | Comparative Example 6 | Comparative Example 7 | Comparative Example 8 | Comparative Example 9 | Comparative Example 10 | Comparative Example 11 |
|---|---|---|---|---|---|---|---|---|
| Position | | | H | I | J | K | L | M |
| Distance from edge of sensor electrode [μm] | | | 550 | 650 | 750 | 850 | 950 | 1050 |
| Height of sensor electrode [μm] | | | | | 19 | | | |
| Height of photosensitive coated film—Thickness (a) [μm] | | Max. | 32 | 30 | 27 | 25 | 23 | 22 |
| | | Average | 30 | 29 | 26 | 25 | 23 | 21 |
| | | Min. | 30 | 27 | 24 | 24 | 22 | 21 |
| | | (Dispersion) | 2 | 3 | 3 | 1 | 1 | 1 |
| Difference of height of photosensitive coated film and height of sensor electrode—Thickness (b) [μm] | | Max. | 13 | 11 | 8 | 6 | 4 | 3 |
| | | Average | 11 | 10 | 7 | 6 | 4 | 2 |
| | | Min. | 11 | 8 | 5 | 5 | 3 | 2 |
| Evaluation of pressure sensing performance | Initial load for pressure sensing in flat state [N] | Max. | 0.25 | 0.24 | 0.19 | 0.17 | 0.14 | short-circuiting at load zero |
| | | Min. | 0.20 | 0.19 | 0.16 | 0.13 | 0.11 | |
| | Sensor Resistivity under heavy load [Ω] | Max. | 1347 | 1167 | 897 | 743 | 711 | — |
| | | Min. | 1287 | 1045 | 822 | 701 | 688 | |
| | Dispersion range of sensor resistivity [Ω] | | 60 | 122 | 75 | 42 | 23 | — |
| | Yes/No of short-circuiting in bent state (φ 10 mm) | | No | No | No | No | Yes, at load zero | Yes, at load zero |

As summarized in Table 1, the thickness (a) of the photosensitive coated film 176 was found to continuously increase as it goes closer to the sensor electrode 12, that is, from Position M towards Position B. At Position A and Position B which fall on the sensor electrode 12, values of the thickness (a) of the photosensitive coated film 176 were found to be nearly equal, and maximum. Based on these findings, it was confirmed that the ramp 131 which slopes upwardly towards the sensor electrode 12 was formed in the photosensitive coated film 176, and that the thickness of the photosensitive coated film 176 was controlled uniformly on the sensor electrode 12.

M illustrated in FIG. 7, followed by formation of the adhesive layer 30 and the pressure sensing film 14, to obtain the pressure sensitive element 100. The thus obtained pressure sensitive element 100 was connected with the detection unit 210, to obtain the pressure sensor 200 with a basic configuration. Both of the first electrode 12a and the second electrode 12b were 19 μm high and 1000 μm wide, arranged 100 μm away from each other. The lead-out line 12c was 13 μm high and 100 μm wide.

The thus obtained Examples and Comparative Examples were evaluated regarding pressure sensitive property as described below. Five samples each of Examples and Comparative Examples were prepared and evaluated. For the evaluation of initial detection sensitivity and the evaluation of detection sensitivity under heavy load, minimum and maximum values from five samples were summarized in Table. In the short-circuit test, "No" was assigned if none of five samples caused short-circuiting, and "Yes" was assigned if even a single sample caused short-circuiting. Results of evaluation are summarized in Table 1.

[Evaluation of Initial Load for Pressure Sensing]

Each of Examples and Comparative Examples was placed on a flat surface, and the pressure sensing film 14 was externally and gradually applied with load, at a position opposed to the sensor electrode 12. The load under which electric conduction was detected first was defined as the initial load for pressure sensing (N).

[Detection Sensitivity under Heavy Load]

Each of Examples and Comparative Examples was placed on a flat surface, and resistivity (Ω) produced when a load of 1.1 MPa (112.5 gf/mm$^2$) was applied to the pressure sensitive element 100 having an area of 4 mm$^2$ was measured. Note that a pressure of 1.1 MPa corresponds to a pressure of approximately 450 gf applied to the 4 mm$^2$ pressure sensitive element.

[Short-Circuit Test]

Each of Examples and Comparative Examples was wound around a glass rod of 10 mm in diameter, and occurrence of short-circuiting in the sensor electrode 12, with no external load applied to the pressure sensitive element 100 (i.e., initial state), was checked.

From the results summarized in Table 1, dispersion of thickness (a) among the values obtained at Position A to Position M was found to be 3 μm or smaller, considered that high-quality pressure sensitive elements 100 were obtained in all five samples on the industrial basis. Since the sensor electrode 12 was formed flat, so that also dispersion of thickness (b) was considered to be 3 μm or smaller similarly to the above. Now according to Examples of this invention, it is highly probable that dispersions in thickness (a) and thickness (b) may be suppressed to 1 μm or smaller as summarized in Table 1, so long as the opening edge 22 of the insulating layer 13 (spacer) is fallen on the sensor electrode 12. As a consequence, also the resultant sensor resistivity under heavy load was found to be most stable at Position A with a dispersion of 9 [Ω] between 1911 [Ω] and 1920 [Ω], and at Position B again with a dispersion of 9 [Ω] between 1859 [Ω] and 1868 [Ω].

In contrast, Comparative Examples taught that, when the opening edge 22 of the insulating layer 13 was fallen outside the sensor electrode 12, specifically assuming that the opening edge 22 of the insulating layer 13 in the configurations described in Patent Documents 1 to 3 was located 500 μm away from the sensor electrode 12, one of the opening edge 22 of the insulating layer 13 falls on a position 450 μm away from the sensor electrode 12, and the other falls on a position 550 μm away from the sensor electrode 12, considering that a typical alignment accuracy in the process of light exposure on the film-formed photosensitive coating material 174 is approximately ±50 μm. In this case, synthetic results obtained from Position G and Position H, summarized in Table 1, can be interpreted as the ranges of dispersion. Referring to the results of thickness (b) in Table 1, such dispersion was found to be 5 μm at most between 11 μm and 16 μm, and also dispersion of sensor resistivity was found to be 115 [Ω] at most between 1287 [Ω] and 1402 [Ω], showing an increasing trend of dispersion.

Judging from the above, formation of the opening 20 of the insulating layer 13, with the opening edge 22 fallen on the sensor electrode 12, was found to be largely effective to improve the sensor quality, as a means for reducing dispersion of the thickness of the insulating layer 13 at the opening edge 22, and dispersion of the sensor resistivity.

Considering now that the typical alignment accuracy in the process of light exposure on the film-formed photosensitive coating material 174 is ±50 μm as described above, the opening edge 22 is preferably recessed again by 50 μm or more inwardly from the edge of the sensor electrode 12. In other words, the outermost part (outer edge 121) of the sensor electrode 12 is preferably formed 50 μm or more outwardly away from the opening edge 22 of the insulating layer 13.

In the short-circuit test, all Example caused no short-circuiting. In contrast, Comparative Examples 10 and 11 caused short-circuiting in a bent initial state. It was found from the results that, if the insulating layer 13 is 5 μm high or higher when measured from the top face of the sensor electrode 12, short-circuiting will not occur even if the pressure sensitive element 100 was bent with a relatively large curvature of 10 mm. It can therefore be concluded that, by forming the insulating layer 13 so as to have a thickness at the opening edge 22, or a height measured from the top face of the sensor electrode 12, of 5 μm or larger and 30 μm or smaller, a problem-free sensor function may be obtained.

According to the pressure sensitive element of this invention, since at least a part of the opening edge of the opening in the insulating layer falls on the conductor pattern, so that the conductor pattern and the pressure sensing film may be kept apart from each other, even if the insulating layer is formed thin. Owing to that the insulating layer may be formed thin, particularly at around the opening edge which affects the initial load for pressure sensing, the thickness of the insulating layer may precisely be controlled. Also since the insulating layer may be formed flat on the conductor pattern conforming to the smoothness of the conductor pattern, so that the thickness of the insulating layer at around the opening edge, which falls on the conductor pattern, may further precisely be controlled. In this way, dispersion of the initial load for pressure sensing will be suppressed from varying among the sensor electrodes and among the pressure sensors, and thereby the pressure sensitive element and the pressure sensor will have improved reliability.

It is apparent that the present invention is not limited to the above embodiments, and may be modified and changed without departing from the scope and spirit of the invention.

These embodiments encompass the technical spirits below:

(1) A pressure sensitive element which includes:
a support substrate;
an electroconductive conductor pattern supported by the support substrate;
a pressure sensing film arranged opposing to the conductor pattern; and
an insulating layer having an opening, and being provided between the support substrate and the pressure sensing film,
at least a part of the opening edge of the opening falling on the conductor pattern, and a part of the conductor pattern being exposed inside the opening, leaving the residual part buried under the insulating layer.

(2) The pressure sensitive element according to (1),
wherein the insulating layer is formed continuously over the support substrate and the conductor pattern, the level of height of the top face of the insulating layer measured from the support substrate is higher above the conductor pattern, than above the support substrate.

(3) The pressure sensitive element according to (2),
wherein the insulating layer:
has, at around the outside of the conductor pattern, a ramp whose thickness increases towards the conductor pattern, and a constant-thickness part located between the ramp and the conductor pattern, whose thickness being kept nearly constant; and
is formed on the conductor pattern, with a nearly constant thickness smaller than that of the constant-thickness part.

(4) The pressure sensitive element according to (2) or (3),
wherein the insulating layer has a thickness, at the opening edge thereof, of 5 µm or larger and 30 µm or smaller.

(5) The pressure sensitive element according to any one of (2) to (4),
wherein the insulating layer has a thickness, on the conductor pattern, of not larger than the thickness of the conductor pattern.

(6) The pressure sensitive element according to any one of (1) to (5),
wherein the conductor pattern contains a sensor electrode having connected thereto a lead-out line, and
at least a part of the opening edge of the opening falls on the sensor electrode.

(7) The pressure sensitive element according to (6),
wherein the sensor electrode has a paired first electrode and a second electrode, and
the opening is arranged so as to extend over the first electrode and the second electrode, placing a part of the opening edge on the first electrode, and the other part on the second electrode.

(8) The pressure sensitive element according to any one of (1) to (7),
wherein the opening edge of the opening is located between the center and the outer edge of the conductor pattern.

(9) The pressure sensitive element according to any one of (1) to (8),
wherein the opening edge of the opening is 50 µm or more away from the outer edge of the conductor pattern.

(10) A pressure sensor which includes the pressure sensitive element described in any one of (1) to (9), and a detection unit electrically connected to the pressure sensitive element, the conductor pattern containing a sensor electrode having connected thereto a lead-out line, and
the detection unit being configured to detect electrical characteristic of the pressure sensitive element, which varies depending on contact resistance between the pressure sensing film and the sensor electrode.

(11) The pressure sensitive element described previously,
wherein the pressure sensing film has an electroconductive property at least at a position thereof opposed to the part of the conductor pattern, and is configured, upon being pressurized, to come into contact with the part of the conductor pattern, to cause electrical conduction between them.

(12) The pressure sensitive element described previously,
wherein the insulating layer is composed of a photocurable resin.

(13) The pressure sensitive element described previously,
wherein the opening edge of the opening has a polygonal shape with a plurality of sides, and at least one side, throughout the full length thereof, falls on the conductor pattern.

(14) The pressure sensitive element described previously,
wherein the conductor pattern contains:
a sensor electrode with a lead-out line connected thereto, and a dummy electrode which is electrically isolated from the sensor electrode and is formed in the same layer with the sensor electrode, and
at least a part of the opening edge of the opening falls on the dummy electrode.

(15) The pressure sensitive element described previously,
wherein the dummy electrode is formed into an open ring shape so as to surround the sensor electrode, and the lead-out line is arranged through a cleft of the dummy electrode.

(16) The pressure sensitive element described previously,
wherein a surface of the insulating layer faced to the pressure sensing film is fixed to the pressure sensing film while placing an adhesive layer in between, meanwhile the other surface of the insulating layer faced to the support substrate is fixed to the support substrate while placing no adhesive layer in between.

(17) The pressure sensitive element described previously,
wherein the pressure sensing film is a resin film containing a carbon particle by which the electroconductive property is imparted to the pressure sensing film.

(18) The pressure sensitive element described previously,
wherein a single sheet of the pressure sensing film is arranged opposing to a plurality of the sensor electrodes.

What is claimed is:

1. A pressure sensitive element comprising:
a support substrate;
an electroconductive conductor pattern supported by the support substrate;
a pressure sensing film arranged opposing to the conductor pattern; and
an insulating layer having an opening, and being provided between the support substrate and the pressure sensing film,
at least a part of an opening edge of the opening falling on the conductor pattern, and a part of the conductor pattern being exposed inside the opening, leaving a residual part buried under the insulating layer,
wherein the pressure sensing film has an electroconductive property at least at a position thereof opposed to the part of the conductor pattern, and is configured, upon being pressurized, to come into contact with the part of the conductor pattern, to cause electrical conduction between the pressure sensing film and the part of the conductor pattern.

2. The pressure sensitive element according to claim 1,
wherein the insulating layer is formed continuously over the support substrate and the conductor pattern, the level of height of the top face of the insulating layer measured from the support substrate is higher above the conductor pattern, than above the support substrate.

3. The pressure sensitive element according to claim 2,
wherein the insulating layer:
has, at around the outside of the conductor pattern, a ramp whose thickness increases towards the conductor pattern, and a constant-thickness part located between the ramp and the conductor pattern, whose thickness being kept nearly constant; and
is formed on the conductor pattern, with a nearly constant thickness smaller than that of the constant-thickness part.

4. The pressure sensitive element according to claim 2,
wherein the insulating layer has a thickness, at the opening edge thereof, of 5 µm or larger and 30 µm or smaller.

5. The pressure sensitive element according to claim 2, wherein the insulating layer has a thickness, on the conductor pattern, of not larger than the thickness of the conductor pattern.

6. The pressure sensitive element according to claim 1, wherein the opening edge of the opening is located between the center and the outer edge of the conductor pattern.

7. The pressure sensitive element according to claim 1, wherein the opening edge of the opening is 50 μm or more away from the outer edge of the conductor pattern.

8. The pressure sensitive element according to claim 1, wherein the insulating layer is composed of a photo-curable resin.

9. The pressure sensitive element according to claim 1, wherein the opening edge of the opening has a polygonal shape with a plurality of sides, and at least one side, throughout the full length thereof, falls on the conductor pattern.

10. The pressure sensitive element according to claim 1, wherein the conductor pattern contains:
a sensor electrode with a lead-out line connected thereto, and a dummy electrode which is electrically isolated from the sensor electrode and is formed in the same layer with the sensor electrode, and
at least a part of the opening edge of the opening falls on the dummy electrode.

11. The pressure sensitive element according to claim 10, wherein the dummy electrode is formed into an open ring shape so as to surround the sensor electrode, and the lead-out line is arranged through a cleft of the dummy electrode.

12. The pressure sensitive element according to claim 10, wherein a single sheet of the pressure sensing film is arranged opposing to a plurality of the sensor electrodes.

13. The pressure sensitive element according to claim 1, wherein a surface of the insulating layer faced to the pressure sensing film is fixed to the pressure sensing film while placing an adhesive layer in between, meanwhile the other surface of the insulating layer faced to the support substrate is fixed to the support substrate while placing no adhesive layer in between.

14. The pressure sensitive element according to claim 1, wherein the pressure sensing film is a resin film containing a carbon particle by which the electroconductive property is imparted to the pressure sensing film.

15. A pressure sensitive element, comprising:
a support substrate;
an electroconductive conductor pattern supported by the support substrate;
a pressure sensing film arranged opposing to the conductor pattern; and
an insulating layer having an opening, and being provided between the support substrate and the pressure sensing film,
at least a part of an opening edge of the opening falling on the conductor pattern, and a part of the conductor pattern being exposed inside the opening, leaving a residual part buried under the insulating layer,
wherein the conductor pattern contains a sensor electrode having a lead-out line connected thereto, and
at least a part of the opening edge of the opening falls on the sensor electrode.

16. The pressure sensitive element according to claim 15, wherein the sensor electrode has a paired first electrode and a second electrode, and
the opening is arranged so as to extend over the first electrode and the second electrode, placing a part of the opening edge on the first electrode, and the other part on the second electrode.

17. A pressure sensor comprising:
a pressure sensitive element; and
a detection unit electrically connected to the pressure sensitive element, wherein the pressure sensitive element comprising:
a support substrate;
an electroconductive conductor pattern supported by the support substrate;
a pressure sensing film arranged opposing to the conductor pattern; and
an insulating layer having an opening, and being provided between the support substrate and the pressure sensing film,
wherein at least a part of an opening edge of the opening falling on the conductor pattern, and a part of the conductor pattern are exposed inside the opening, leaving a residual part buried under the insulating layer,
wherein the conductor pattern contains a sensor electrode having a lead-out line connected thereto, and
wherein the detection unit is configured to detect electrical characteristic of the pressure sensitive element, which varies depending on contact resistance between the pressure sensing film and the sensor electrode.

* * * * *